United States Patent [19]

Schwär

[11] Patent Number: 5,148,638
[45] Date of Patent: Sep. 22, 1992

[54] APPARATUS FOR GRINDING AN ANNULAR WORKPIECE

[75] Inventor: Rudolf Schwär, Wuppertal, Fed. Rep. of Germany

[73] Assignee: Ernst Thielenhaus KG, Wuppertal, Fed. Rep. of Germany

[21] Appl. No.: 764,487

[22] Filed: Sep. 24, 1991

[30] Foreign Application Priority Data

Feb. 16, 1991 [DE] Fed. Rep. of Germany ....... 4104819

[51] Int. Cl.$^5$ .............................................. B24B 47/02
[52] U.S. Cl. .......................... 51/215 CP; 51/215 UE; 51/237 R; 198/486.6
[58] Field of Search .......... 51/215 R, 215 CP, 215 H, 51/215 UE, 165.77, 165.93, 289 R, 290, 291; 198/468.2, 468.6; 414/222, 224, 745.7, 746.3

[56] References Cited

U.S. PATENT DOCUMENTS 2,842,900 7/1958 Durland ................................. 51/236
4,067,450 1/1978 Birdwell ........................... 198/468.6

FOREIGN PATENT DOCUMENTS 1752064 8/1973 Fed. Rep. of Germany .
1752520 10/1973 Fed. Rep. of Germany .
2631131 3/1977 Fed. Rep. of Germany .
1937802 4/1981 Fed. Rep. of Germany .

Primary Examiner—Bruce M. Kisliuk
Assistant Examiner—Bryan Reichenbach
Attorney, Agent, or Firm—Herbert Dubno; Andrew Wilford

[57] ABSTRACT

An apparatus for grinding annular workpieces has a predetermined number of grinding stations including an upstream station and a downstream station, the stations are spaced a predetermined distance from one another along a straight path, a holder at each of the stations for gripping and rotating the workpieces, a tool at each of the stations for grinding the respective workpiece held by the respective holder, and an input device adjacent the upstream station for feeding workpieces sequentially to the apparatus and an output device adjacent the downstream station for receiving workpieces from the downstream station. An elongated transport bar has the predetermined number of laterally and generally upwardly open seats including an upstream seat and a downstream seat with the seats spaced longitudinally apart on the bar by the predetermined distance. This bar is stepped through an arc between an upstream position with its upstream seat aligned with the input device to receive a workpiece therefrom and the others of its seats aligned with the grinding stations to position a workpiece held in the other seats in the respective station and a downstream position with its upstream seat aligned with the upstream station to supply to it the workpiece received from the input device and with its other seats aligned with stations downstream of the upstream station to supply to them the workpieces from the immediately upstream stations.

6 Claims, 5 Drawing Sheets

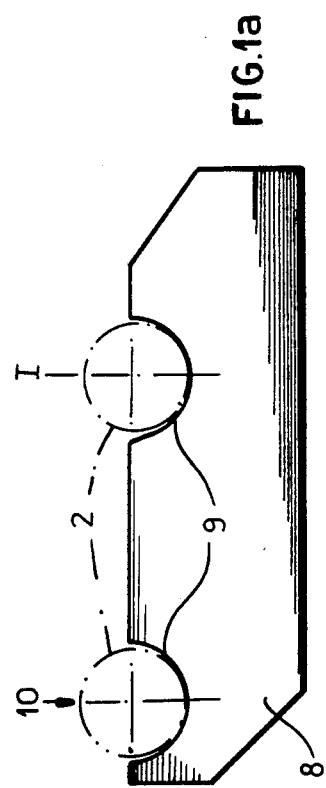
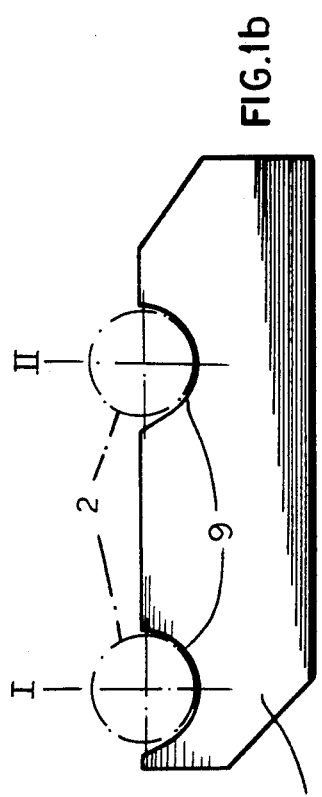
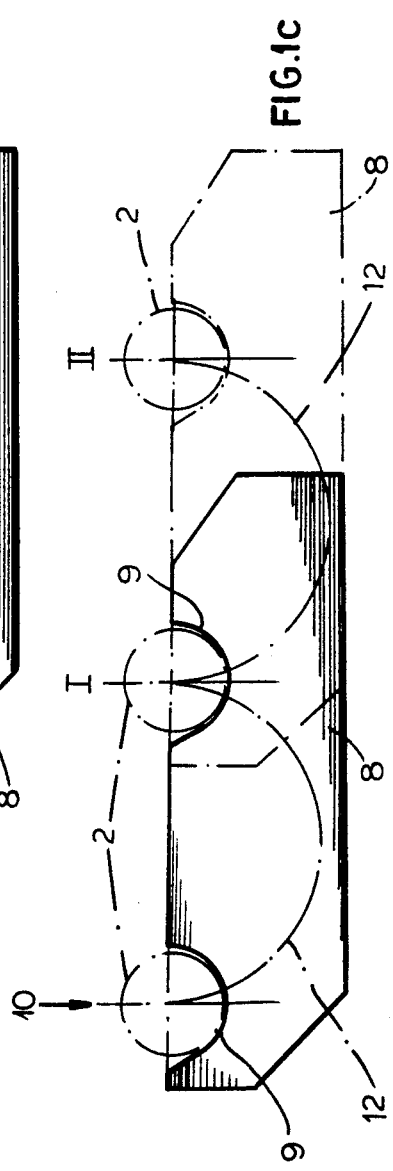

APPARATUS FOR GRINDING AN ANNULAR WORKPIECE

FIELD OF THE INVENTION

The present invention relates to an apparatus for grinding a periphery of an annular workpiece. More particularly this invention concerns a device for finish grinding the internal and/or external surface of a bearing ring.

BACKGROUND OF THE INVENTION

A standard mass-production grinding apparatus for annular workpieces has a plurality of grinding stations each provided with a holder that retains and rotates the workpieces and a tool that machines its inner and/or outer periphery. There are at least two such stations with the upstream station provided with a coarse grinding stone and the downstream station with a fine grinding or burnishing stone. The workpieces are delivered to the apparatus by an input device that opens adjacent the upstream station and the workpieces are taken from the apparatus by an output device that receives the finished workpieces from the downstream station.

In order to move the workpieces through the stations it is standard to provide a carousel arrangement as described in German patent documents 1,752,520 of E. Thielenhaus (citing U.S. Pat. Nos. 1,916,916, 2,145,310, 2,773,333, and 2,813,379), 1,752,064 (citing U.S. Pat. No. 2,224,265), and U.S. Pat. No. 1,937,802 (citing U.S. Pat. Nos. 2,842,900 and 2,771,714). This carousel has a plurality of angularly equispaced seats that ar orbited through the successive grinding stations and also past the input and output stations. Thus periodically all the workpieces are advanced one station, with a new workpiece being moved from the input station to the upstream grinding station, the workpiece in the downstream station being moved to the output station, and all the other workpieces being moved down one station.

Such a system is fairly bulky, requiring that the grinding stations be positioned about a common center. This makes the apparatus fairly difficult to operate and work on. In addition if workpiece size changes, the carousel must be changed to one with differently dimensioned seats. This carousel is a fairly bulky and mechanically complex item in itself so its replacement entails quite some down time for the machine.

OBJECTS OF THE INVENTION

It is therefore an object of the present invention to provide an improved multistation grinding apparatus.

Another object is the provision of such an improved multistation grinding apparatus which overcomes the above-given disadvantages that is which is of fairly simple construction.

SUMMARY OF THE INVENTION

An apparatus for grinding annular workpieces according to this invention has a predetermined number of grinding stations including an upstream station and a downstream station with the stations spaced a predetermined distance from one another along a straight path, a holder at each of the stations for gripping and rotating the workpieces, a tool at each of the stations for grinding the respective workpiece held by the respective holder, and an input device adjacent the upstream station for feeding workpieces sequentially to the apparatus and an output device adjacent the downstream station for receiving workpieces from the downstream station. An elongated transport bar has the predetermined number of laterally and generally upwardly open seats including an upstream seat and a downstream seat with the seats spaced longitudinally apart on the bar by the predetermined distance. This bar is stepped through an arc between an upstream position with its upstream seat aligned with the input means to receive a workpiece therefrom and with the downstream seat aligned with the upstream grinding station to position a workpiece held in the downstream seat in the upstream station and a downstream position with its upstream one seat aligned with the upstream station to supply to it the workpiece received from the input means and with its downstream seat aligned with the downstream station to supply to it the workpiece from the upstream station.

Thus according to this invention an extremely simple device is used to step the workpieces from the input, through the two stations, and to the output. If workpiece size changes, it is fairly simple to replace the bar, which has no moving parts, with a bar having differently dimensioned seats. The grinding stations, which can be any desired number, can be aligned in a straight line for easy monitoring of operation and servicing.

According to this invention the path and bar extend at an acute angle to the horizontal. There is the same number of stations as of seats and in the downstream position each seat is directly juxtaposed with a respective station. Thus in the upstream position the bar will not cover the furthest downstream station, but in the downstream position one of the seats will be able to give a workpiece to each station. The downstream station simply drops its workpiece when complete into the output device.

Furthermore according to the invention each holder comprises a rotatable spindle engageable with the respective workpiece and a pusher for retaining the respective workpiece against the respective spindle. The stepper itself is formed by a support extending generally parallel to the path, a main slide displaceable along the support, a cross slide displaceable perpendicular to the path on the main slide, and a pivotal oscillating crank having an outer end connected to the cross slide. Such a construction is extremely simple.

In accordance with further features of the invention the path and bar extend at about 45° to the horizontal. Of course so long as the bar is not perfectly vertical so that the seats open somewhat upward, the workpiece rings will be able to hold in semicircular seats.

BRIEF DESCRIPTION OF THE DRAWING

The above and other objects, features, and advantages will become more readily apparent from the following, reference being made to the accompanying drawing in which:

FIGS. 1a, 1b, and 1c are schematic side views illustrating the positions assumed by the workpiece mover of the grinding system of this invention;

SPECIFIC DESCRIPTION

Figure 5:
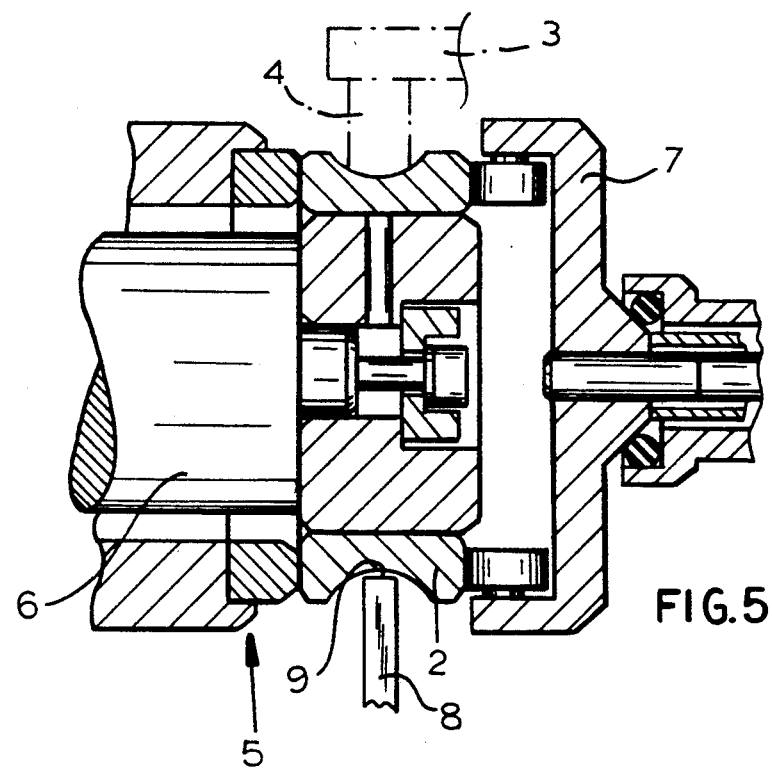
FIG. 5 is a section taken along line V—V of FIG. 2.
Figure 6:
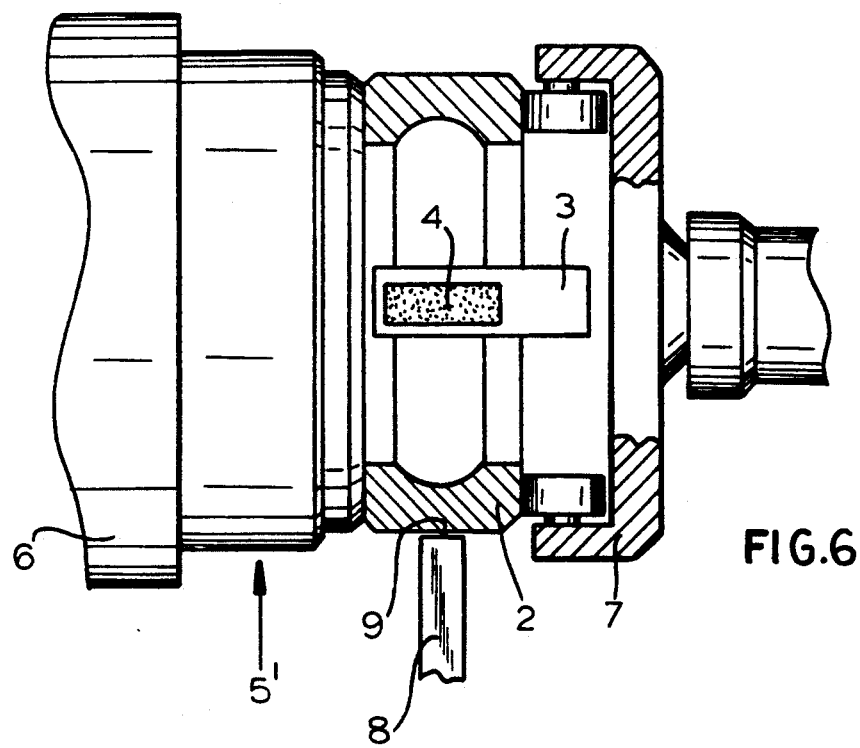
FIG. 6 is a view like FIG. 5 illustrating another arrangement according to the invention.

As seen in FIGS. 2 through 6 a grinding apparatus for annular workpieces 2, here bearing races or rings, has a pair of grinding stations I and II spaced apart along a straight path P extending at an angle or 45° to the horizontal. Each station I and II is provided with a tool 4 held in a holder 3 and with a workpiece holder 5 comprising a rotatable spindle 6 and a pusher or abutment 7 that presses the ring workpiece 2 into engagement with the spindle 6 as described in the above-cited patent references. FIG. 5 shows such a holder 5 for workpieces 2 that are to be externally ground and FIG. 6 shows a holder 5' for workpieces 2 that are to be internally ground. Although the drawing shows for simplicity of illustration only two grinding stations I and II, there could be many more than this number.

According to this invention a transport bar 8 extends always parallel to the path P and is formed on its upper long side with a pair of semicircular seats 9 separated by a spacing S which is the same spacing as that between the stations I and II along the path P. Opening into the path upstream of the upstream station I and spaced from it by the distance S is an input or infeed chute 10 and opening below the downstream station II is an output or outfeed chute 11.

Figure 2:
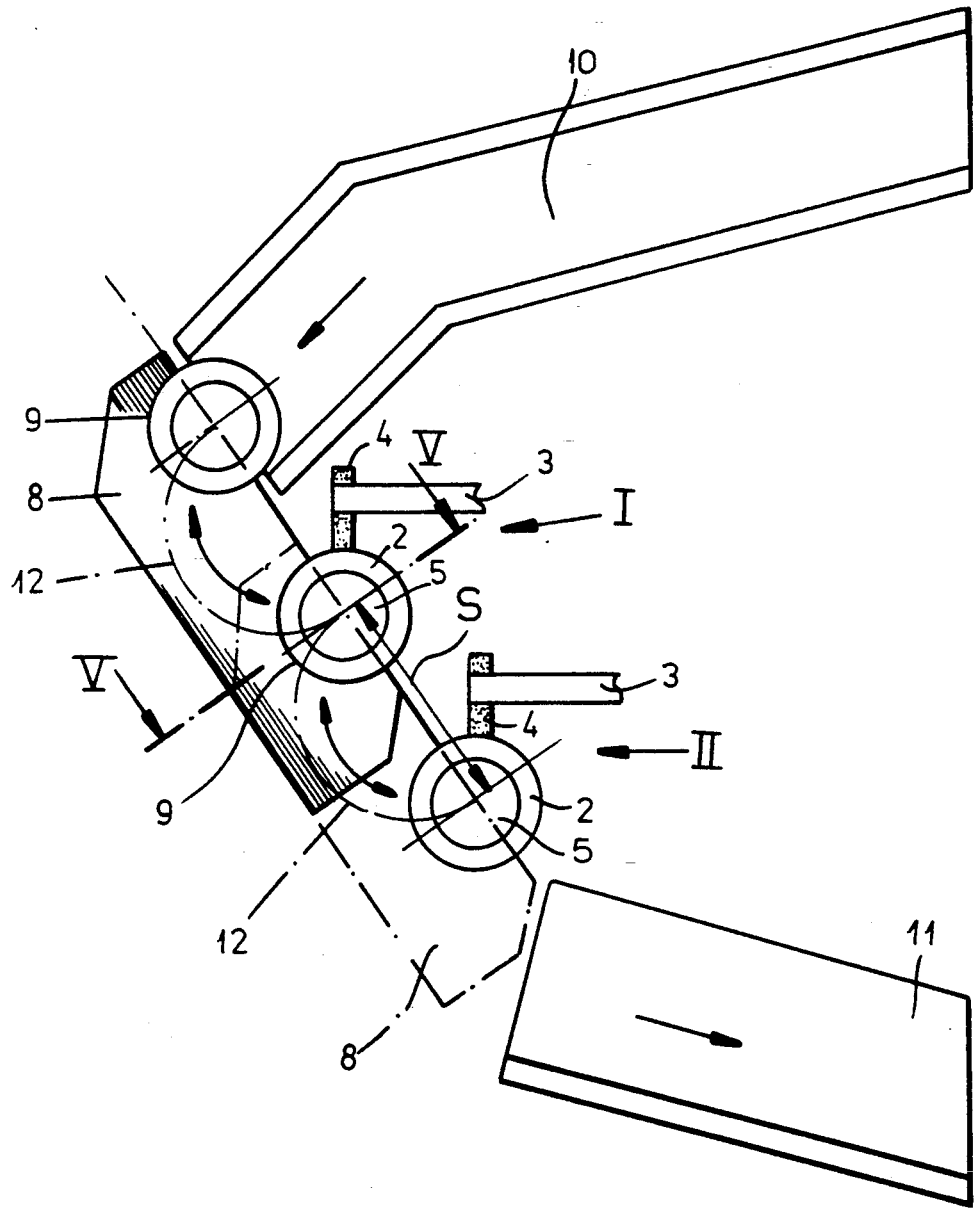
FIG. 2 is a largely schematic side view illustrating the grinding system.
Figure 3:
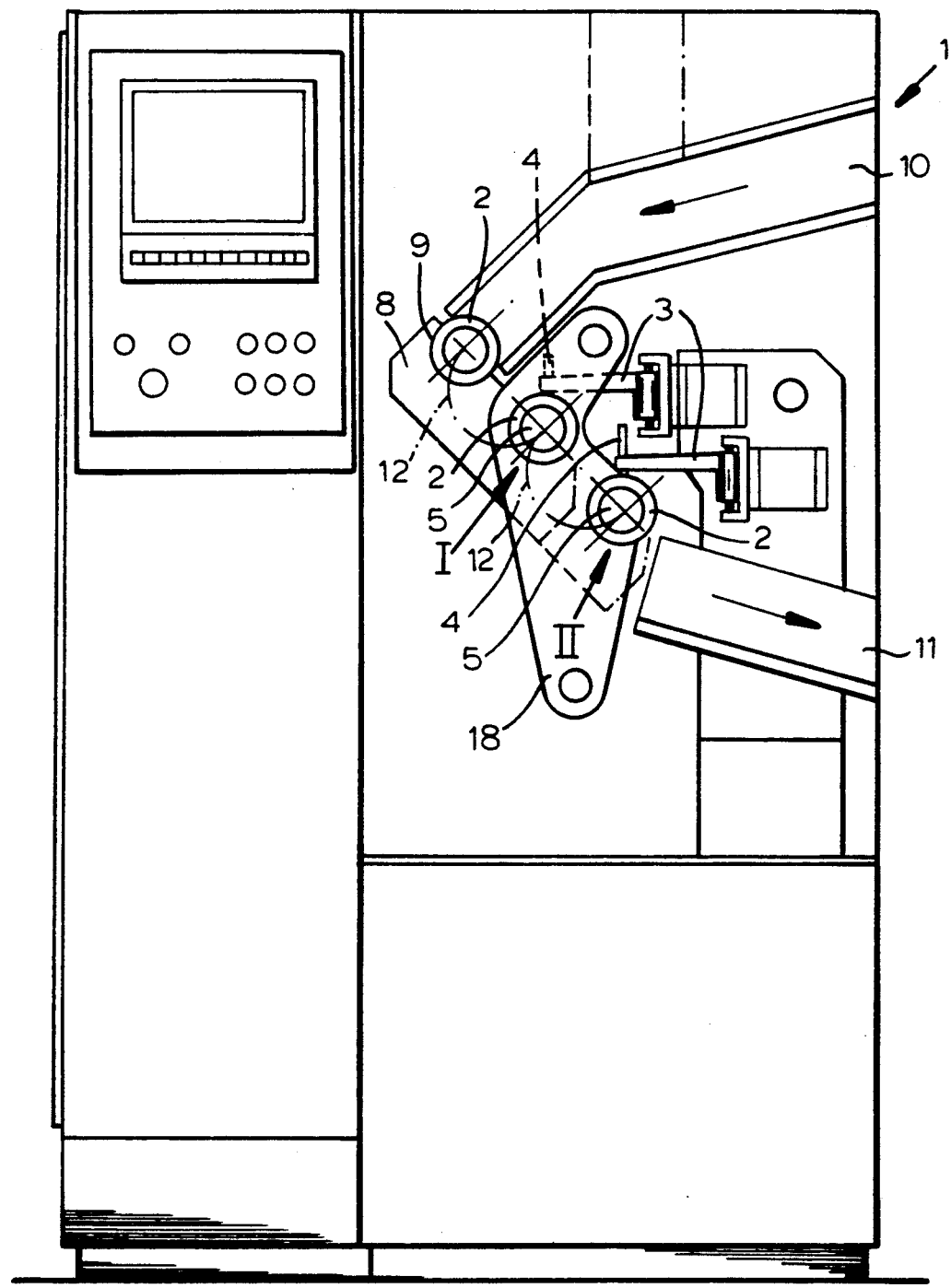
FIG. 3 is a small-scale side view of the apparatus of the invention.
Figure 4:
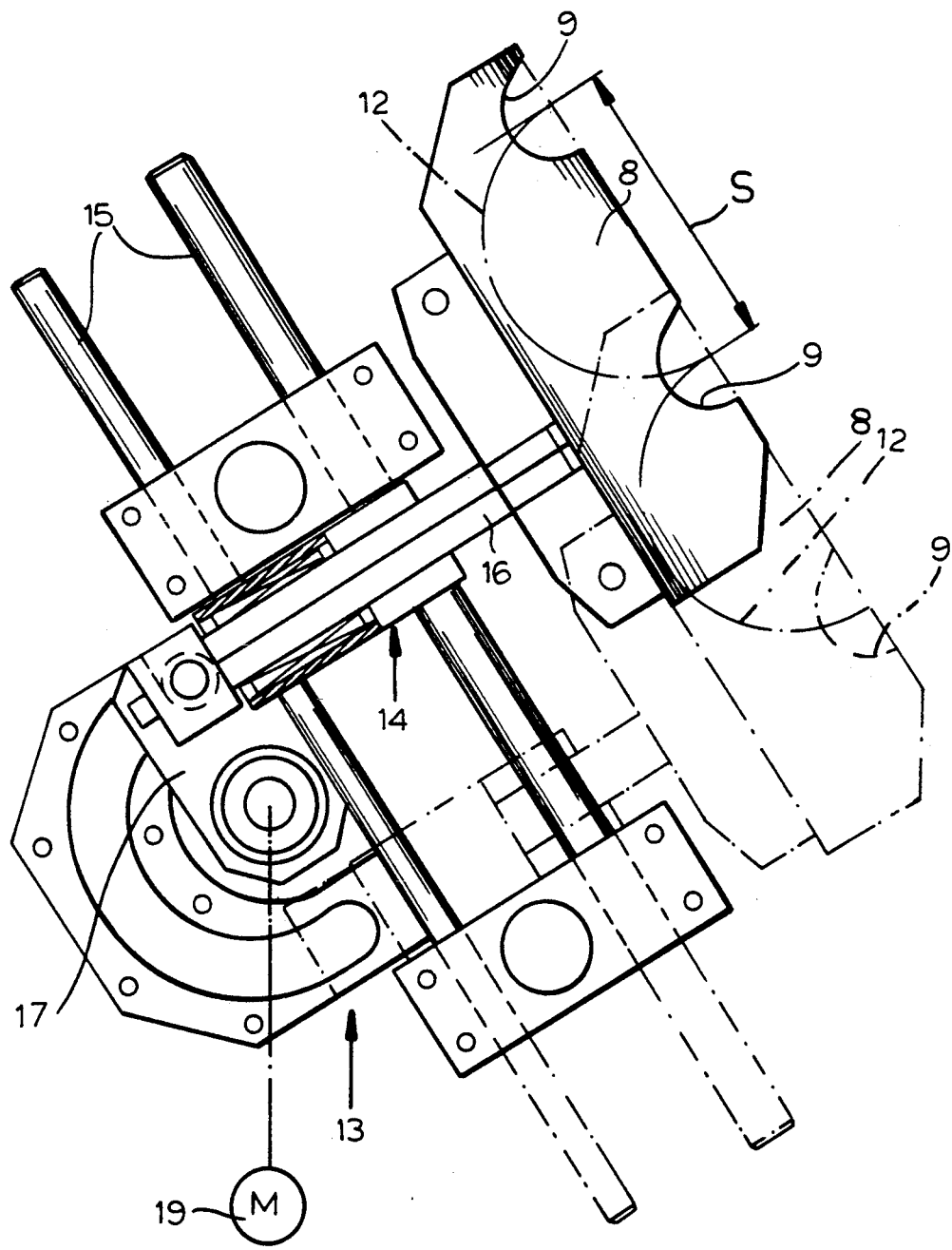
FIG. 4 is a detail view of the workpiece mover.

An actuator 13 moves the bar 8 along an arcuate trajectory 12 between an upstream position shown in FIGS. 1a, 1c, and 2 and a downstream position shown in FIGS. 1b and in dot-dash lines in FIG. 1c. This actuator 13 comprises a main slide 14 movable parallel to the path P along support/guide rods 15 extending parallel to this path P, and a cross slide 16 movable perpendicular to the rods 15 and path P on the slide 14. A crank 17 that is oscillated through 180° by a motor 19 (FIG. 4) has an outer arm pivoted on the cross slide 16.

The device describes above operates as follows:

To start with the stations I and II are empty and the bar 8 is in the upstream (FIG. 1a, FIG. 1b, FIG. 2) position. The input device 10 drops a ring 2 into the upstream seat 9. Then the actuator 13 swings the bar 8 down into the downstream (FIG. 1b) position to move this ring 2 into the upstream station where the holder 5 grabs it and rotates it while the stone 4 engages and coarse grinds it.

While this coarse grinding of the first workpiece 2 is taking place in station I, the bar 8 is swung back up to the upstream position. The upstream seat 9 of the bar 8 receives a second workpiece 2 and the downstream seat 9 engages under the first workpiece 2 in the station I. The coarse grinding is completed and the holder 5 of the upstream station 1 releases the first workpiece 2 so it drops into the downstream seat 9, and then the bar 8 swings down into the downstream position, loading the first workpiece 2 into the downstream station II for gripping by its holder 5 and finish grinding by its tool 4 while it loads the second workpiece 2 into the upstream station I for coarse grinding.

During coarse grinding of the second workpiece 2 and finish grinding of the first workpiece 2, the bar 8 is swung back into the upstream position to receive a third workpiece 2 in its upstream seat 9 and to align its downstream seat 9 with the upstream station I. Both holders 5 now release their workpieces 2. The workpiece 2 in the station I drops into the downstream seat 9 and the workpiece 2 in the station II drops into the outfeed chute 11.

The bar 8 is then moved down to the downstream position, loading the third workpiece 2 into the station I and the second workpiece into the station II.

Thereafter the operation continues to repeat itself, stepping succeeding workpieces 2 from the input device 10, to the station I, to the station II, to the output device 11.

If workpiece size changes, it is a fairly simple matter to change the bar 8. This is an extremely simple machine element with no moving parts so that even if a new holder bar 8 has to be made up, it will be fairly cheap to make.

I claim:

1. An apparatus for grinding annular workpieces, the apparatus comprising:
   a predetermined number of grinding stations including an upstream station and a downstream station, the stations being spaced a predetermined distance from one another along a straight path;
   means including a holder at each of the stations for gripping and rotating the workpieces;
   means including a tool at each of the stations for grinding the respective workpiece held by the respective holder;
   input means adjacent the upstream station for feeding workpieces sequentially to the apparatus;
   output means adjacent the downstream station for receiving workpieces from the downstream station;
   an elongated transport bar having the predetermined number of laterally and generally upwardly open seats including an upstream seat and a downstream seat, the seats being spaced longitudinally apart on the bar by the predetermined distance; and
   means for stepping the bar through an arc between an upstream position with its upstream seat aligned with the input means to receive a workpiece therefrom and the others of its seats aligned with the grinding stations to position a workpiece held in the other seat in the respective station and
   a downstream position with its upstream seat aligned with the upstream station to supply to it the workpiece received from the input means and with its other seat aligned with a station downstream of the upstream station to supply to it the workpiece from the upstream station.

2. The grinding apparatus defined in claim 1 wherein the path and bar extend at an acute angle to the horizontal.

3. The grinding apparatus defined in claim 2 wherein there is the same number of stations as of seats and in the downstream position each seat is directly juxtaposed with a respective station.

4. The grinding apparatus defined in claim 1 wherein each holder comprises a rotatable spindle engageable with the respective workpiece and a pusher for retaining the respective workpiece against the respective spindle.

5. The grinding apparatus defined in claim 1 wherein the stepping means includes:
   a support extending generally parallel to the path;
   a main slide displaceable along the support;
   a cross slide displaceable perpendicular to the path on the main slide; and
   a pivotal oscillating crank having an outer end connected to the cross slide.

6. The grinding apparatus defined in claim 1 wherein the path and bar extend at about 45° to the horizontal.

* * * * *